J. L. HOAG.
Corn-Planter.
No. 22,650.  Patented Jan 18, 1859.
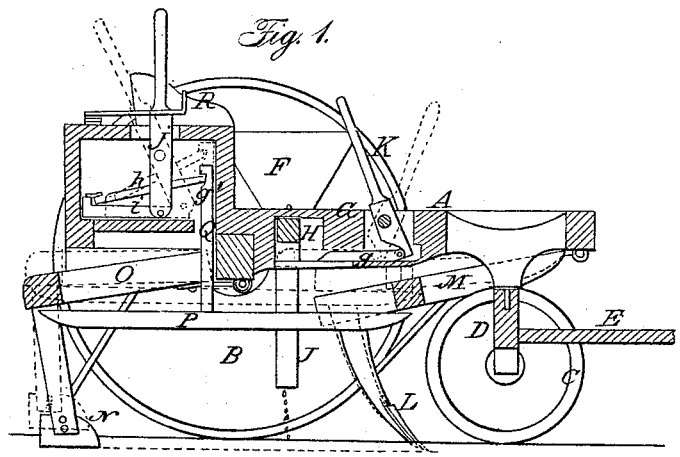
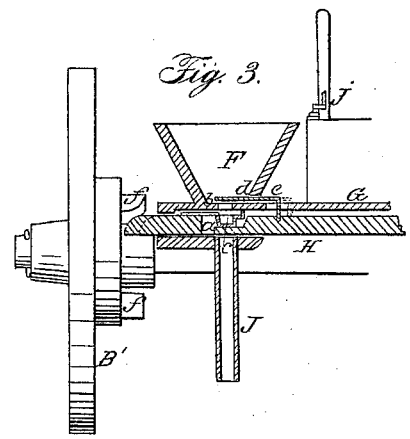
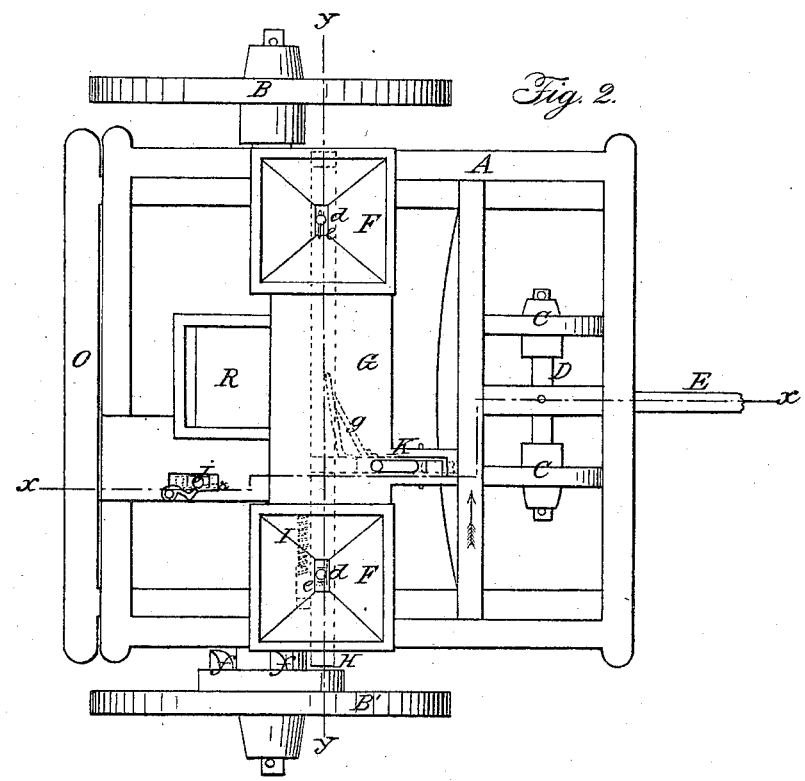

UNITED STATES PATENT OFFICE.

JOHN L. HOAG, OF GENOA, ILLINOIS.

IMPROVEMENT IN CORN-PLANTERS.

Specification forming part of Letters Patent No. 22,650, dated January 18, 1859.

*To all whom it may concern:*

Be it known that I, JOHN L. HOAG, of Genoa, in the county of De Kalb and State of Illinois, have invented a new and Improved Machine for Planting Corn; and I do hereby declare that the following is a full, clear, and exact description of the same, reference being had to the annexed drawings, making a part of this specification, in which—

Figure 1 is a longitudinal vertical section of my improvement, $x\,x$, Fig. 2, showing the plane of section. Fig. 2 is a plan or top view of the same. Fig. 3 is a transverse vertical section of one side of my improvement, $y\,y$, Fig. 2, showing the plane of section.

Similar letters of reference indicate corresponding parts in the several figures.

To enable others skilled in the art to fully understand and construct my invention, I will proceed to describe it.

A represents a rectangular frame, which is supported by two wheels, B B', at its back part, and two smaller wheels, C, at its front part, the wheels C being attached to a turning axle, D, having a tongue or pole, E, secured to it.

F F represent two hoppers secured to a cross-piece, G, on the frame A.

To the under side of the cross-piece G there is attached a sliding bar, H, having a spiral spring, I, connected to it, as shown by the dotted lines in Fig. 2. This sliding bar has a hole, $a$, made through each end, and over each of which holes a plate, $b$, is secured. (See Fig. 3.) The bottoms of the hoppers have each a hole, $d$, made through them, and a rod, $e$, passes through the side of each hopper and directly over the holes $d$, said rods being attached to the bar H.

To the inner or back end of the hub of the wheel B' there are attached projections $f$, as shown clearly in Figs. 2 and 3, and to the under sides of the hoppers F F there are attached conveying-tubes J—one to each hopper.

K is a vertical lever attached to the frame A. The lower end of this lever has an arm, $g$, attached to its side by a hinge or joint, and the outer end of the arm is fitted in a recess in the bar H. (See Fig. 1 and dotted lines in Fig. 2.)

The corn to be planted is placed in the hoppers F F, and as the machine is drawn along the projections $f$ on the hub of the wheel B' will strike the end of the bar H and throw it inward, and the spring I will throw the bar H back every time a projection passes it. By this means a reciprocating motion is given the bar H. The corn in the hopper falls through the holes $d$ in the bottoms of the hoppers, when the plates $b$ are thrown from underneath the holes $d$, and fills a space or recess, $c$, underneath each hopper, from which spaces or recesses the corn falls when the holes $a$ in the bar H are brought in line with them, the corn passing down through the tubes J into the furrows prepared to receive them. (See Fig. 3.)

The bar may be prevented from being acted upon by the projections $f$ at any time by operating the lever K, which will throw the bar H free from the projections. The rods $e$ vibrate over the holes $d$ in the hoppers and prevent the clogging of the grain within the holes $d$.

L L are the furrow-shares, which are attached to a swinging frame, M, secured to the under side of the frame A; and N N are covering-shares attached to a swinging frame, O, secured to the under side of the back part of the frame A. The frame O has a bar, P, attached to it, the front end of said bar projecting underneath the swinging frame M. (See Fig. 1.)

To the bar P there is attached an upright, Q, having a notch or recess, $g'$, in its upper end, into which a lever, $h$, catches, said lever being connected by a slide, $i$, to an upright lever, $j$, by the side of the driver's seat R.

The driver, by operating the lever $j$ by hand, may elevate the shares, when desired, so that they will be above the surface of the ground, and by applying his foot to the lever K the distributing device will be rendered inoperative, and the machine may be drawn from place to place the same as an ordinary vehicle.

Having thus described my invention, I claim and desire to secure by Letters Patent—

1. The arrangement and combination of the arm $g$, lever K, and bar H, said lever serving as an oblique brace to hold the bar H, as is shown in Fig. 2, as and for the purposes set forth.

2. The arrangement and combination of the lever $h$, slide $i$, lever $j$, upright Q, bar P, and swinging frames O M, as and for the purposes herein shown and described.

JOHN L. HOAG.

Witnesses:
HORACE HOWARD,
DAVID C. HOAG.